United States Patent [19]

Cipelletti

[11] 4,441,334
[45] Apr. 10, 1984

[54] ICE-CREAM MACHINE

[76] Inventor: Alberto Cipelletti, Via Emilia, Guardamiglio, Italy

[21] Appl. No.: 355,293

[22] Filed: Mar. 8, 1982

[30] Foreign Application Priority Data

Mar. 10, 1981 [IT] Italy .............................. 21032/81[U]

[51] Int. Cl.³ ............................................ F25D 23/12
[52] U.S. Cl. ...................................... 62/258; 62/261; 62/342
[58] Field of Search ...................... 62/261, 342, 259.1, 62/338, 392, 258, 525

[56] References Cited

U.S. PATENT DOCUMENTS

| | | | |
|---|---|---|---|
| 1,898,560 | 2/1933 | Mezzapesa | 62/261 X |
| 1,926,341 | 9/1933 | Lipman | 62/261 X |
| 2,093,856 | 9/1937 | Wales | 62/261 X |
| 2,274,615 | 2/1942 | Newton | 62/525 |
| 2,849,868 | 9/1958 | Anderson | 62/342 |
| 2,850,884 | 9/1958 | Jacobs | 62/258 |
| 3,788,089 | 1/1974 | Graves | 62/520 X |
| 3,797,268 | 3/1974 | Garavelli | 62/342 X |
| 3,832,862 | 9/1974 | Ingels | 62/261 X |

Primary Examiner—William E. Tapolcai
Attorney, Agent, or Firm—Millen & White

[57] ABSTRACT

This invention relates to an ice cream machine for a domestic use which is placed and embedded in a piece of furniture such as kitchen furniture. The refrigerating coil of the ice cream machine includes a branch portion for permanently refrigerating the remaining free space of the furniture.

7 Claims, 3 Drawing Figures

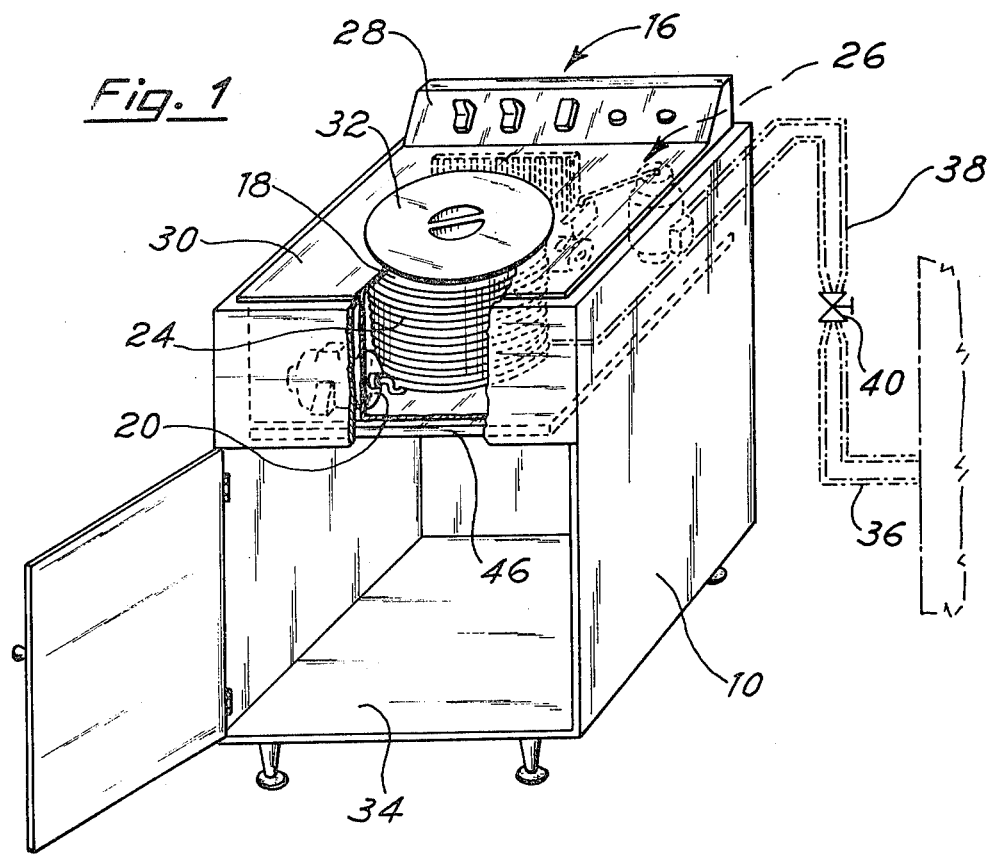
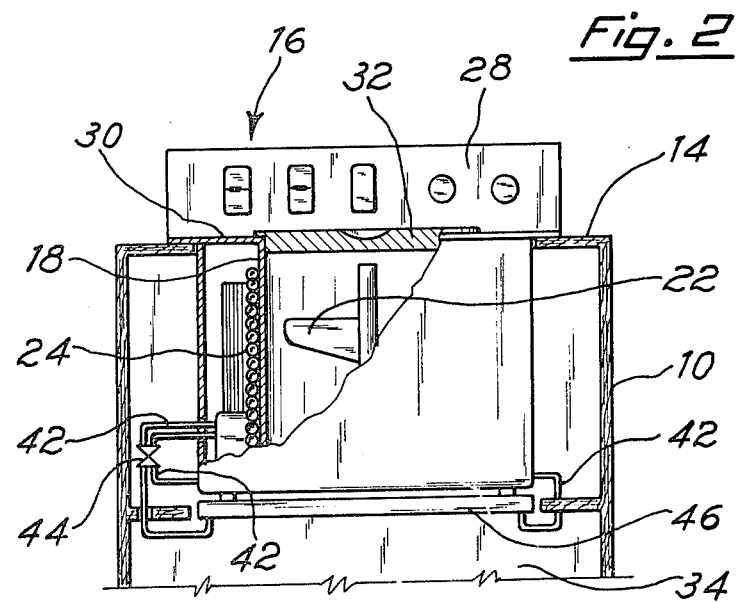

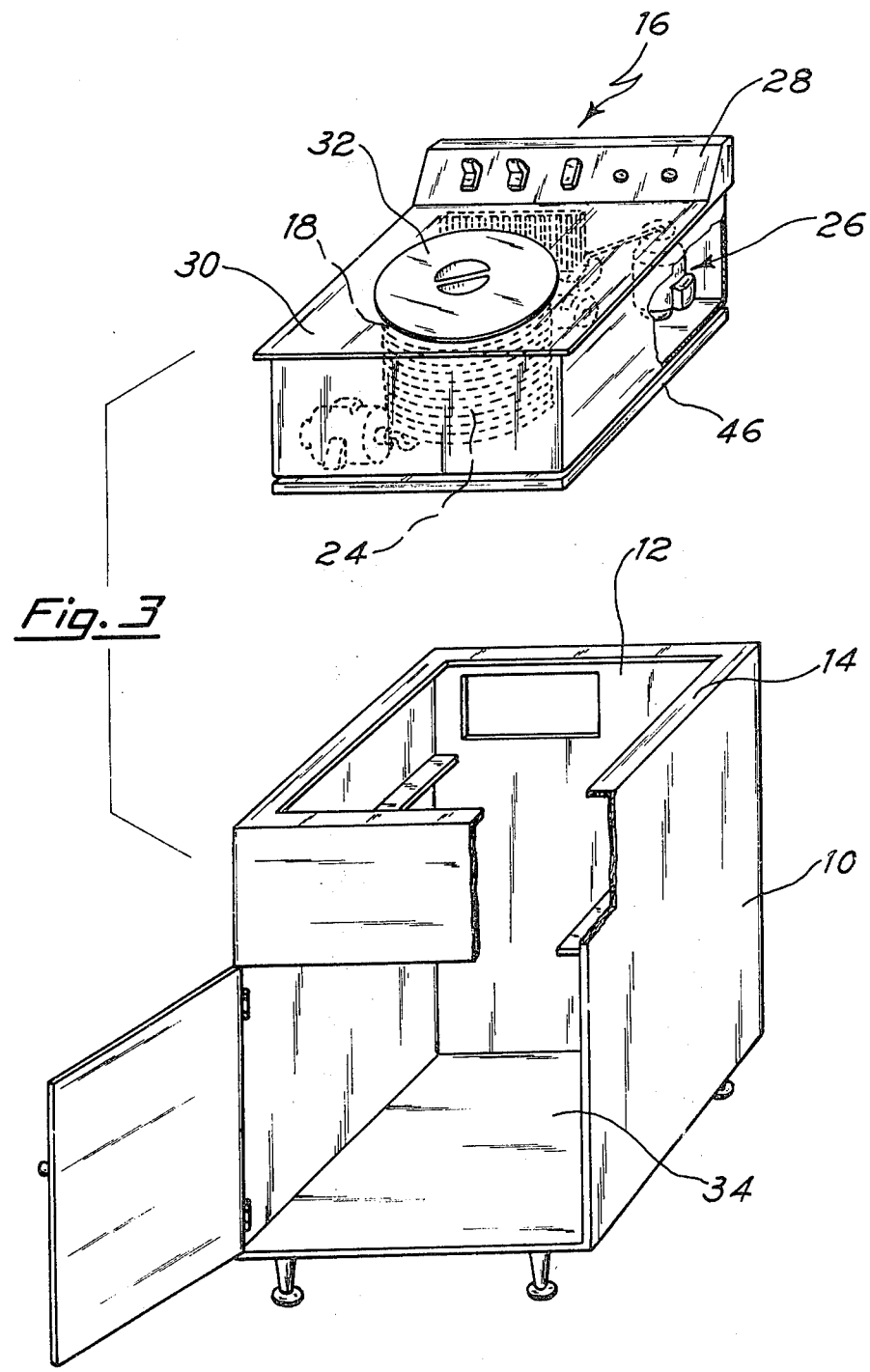

ICE-CREAM MACHINE

BACKGROUND OF THE INVENTION

1. Field of the Invention

The present invention relates to an ice-cream machine, particulary suitable for a domestic use.

2. Description of the Prior Art

The ice-cream machines for a domestic use produced until now are of the type comprising its own refrigerating system and of the type adopted for being placed into a refrigerator freezer for the necessary cooling ice-cream mixture.

The ice-cream machines of the first type are very cumbersome and heavy and for this reason it can be difficult to house them, especially in the modern houses where available space is very reduced. Moreover, these first type of machines are very expensive and since they are generally used at random, the buyer often considers them an unjustified expense.

The ice-cream machines of the second type are not as heavy and cumbersome as the first type machines, but generally people do not have a freezer sufficiently large to contain them, or they are compelled to empty their freezer to place the ice-cream machine therein. Moreover, when the ice-cream machines are placed into the freezer, they require a lot of time to make the ice-cream, since the thermal exchange between the cream mixture and the freezer is very low.

SUMMARY OF THE INVENTION

Therefore, an object of the present invention is to provide new kind of ice-cream machine for a domestic use which eliminates the drawbacks presented by the prior ice-cream machines, particularly, the drawbacks of the ice-cream machines provided with their own refrigerating system.

According to the invention, an ice-cream machine for a domestic use is provided, forming with its components and accessories an enbloc housed and enclosed in a kitchen furniture through an opening provided in the furniture plane, or enclosed in a drawer thereof. In this way the ice-cream machine is completely enclosed in the furniture avoiding the problem of encumbrance. When the enbloc is embedded, it is fixed to a lower plate substantially located at the same level of the ice-cream machine opening, and with said lower plate supported by the furniture. Accordingly, the lower plate can be used as the usual working plane of a piece of furniture, particulary of kitchen furniture.

According to the invention two embodiments are provided, the first one presenting a self contained refrigerating system placed into the enbloc, the second embodiment presenting the refrigerating coil of the ice-cream machine container fed by a separate refrigerating system, for example, the refrigerating coil equipped on a common kitchen refrigerator. In the latter case the cool fed to the ice-cream machine is controlled by suitable valve means.

In the case of an ice-cream machine using a separated refrigerating system, it is possible to obtain a fixed electric appliance, wherein the refrigerated zone is limited to the container making the ice-cream.

In both cases of a separated refrigerating system and moreover, of an ice-cream machine provided with its own refrigerating system, it is desirable to provide a branch parallel to the refrigerating coil of the mixing container, with said branch being controlled by suitable valve means, and furnished with cooling accessory services.

Particulary, a cooling plate may be provided, said cooling plate being fed by the refrigerating system of the ice-cream machine and suitable for refrigerating an inner place in the same furniture wherein the machine is housed, or eventually in a space of an adjacent piece of furniture. The space is insulated so as to provide, simply and economically, a zone with a temperature comprised between the ambient temperature and the refrigerator temperature, i.e. a cellar temperature suitable for wine and/or vegetables preservation. Thus, the refrigerating system will be exploited also when the machine is not operated and will justify its buying expense.

BRIEF DESCRIPTION OF THE DRAWINGS

FIG. 1 is a schematic perspective view of an ice-cream machine enclosed in a piece of kitchen furniture.

FIG. 2 is a partial cross-section view along a vertical plane through the ice-cream machine and the furniture.

FIG. 3 is a perspective view of the set of the FIG. 1 with components shown detached.

DESCRIPTION OF THE PREFERRED EMBODIMENT

With reference to the FIG. 3, in the lower plane of a piece of furniture, and particularly, of a kitchen furniture 10 an opening 12 is provided surrounded by a free edge 14.

Through the opening 12, it is possible to insert an enbloc 16 made up of the ice-cream machine, with said ice-cream machine comprising a mixing container 18 wherein an ice-cream mixture is mixed by means of an agitator 22 operated by an electric engine 20 (FIG. 2), and with said container 18 being cooled by a refrigerating coil 24.

When the ice-cream machine is provided with its own refrigerating system, this refrigerating system 16 is placed inside the enbloc of the machine and a control board 28 is provided to operate the machine.

According to the invention, the enbloc 16 is fixed to the lower surface of an upper plate 30 substantially placed at the same level of the mixing container 18, and said container opening on the said plate 30 and closed with the cover 32.

The plate 30 presents a larger surface as to the enbloc 16 and when the enbloc is inserted into the opening 20, the plate 30 is supported by the edge 14 of the furniture. The ice-cream machine substantially fills a reduced space leaving below it a free volume 34. According to a first advantage of the invention it is possible to house the ice-cream machine and avoid requiring a movement from a non use position to an operative position. Thus, the upper surface of the plate 30 with the cover 32 can be used as working plane.

The cool feeding to the ice-cream machine container 18 can involve the use of an external refrigerating system or the use of a refrigerating system provided within the enbloc of the machine.

In the first case, when using an external refrigerating system, the refrigerating coil 24 of the mixing container can be, for example, connected with the conventional domestic refrigerator by means of a couple of ducts 36 and 38; these ducts being controlled by a valve 40.

This valve 40 controls the fluid cool feeding during the operation of the ice-cream machine.

In the second case when considering an ice-cream machine comprising its own refrigerating system, it is provided (as shown in FIG. 2) with a branch 42 parallel to the refrigerating coil 24. Said branch 42, controlled by a valve 44, can be fed in a controllable way with the refrigerating fluid of the refrigerating system 26; thus allowing the refrigeration of new volumes or new applications.

A refrigerating plate 46 of known type is provided, said plate being placed in an insulated space, and said space 34, advantageously obtained below the ice-cream machine, inside the furniture 10.

This space 34, by means of its insulation, can maintain an inner temperature of 6°-10° C., suitable for wine, fruits or vegetables preservation.

During ice-cream machine operation, the refrigeration of the space 34 is interrupted. This interruption however, is reduced in the time and on the order of half an hour to one hour, and does not cause any problems of adulteration of the substances contained in the space 34.

Moreover, it is possible to use the refrigerating system of the ice-cream machine for other services like, for example, ice-making.

It is to be understood that many changes and modifications can be made to the shown embodiment, without departing from the spirit and scope of the present invention.

I claim:

1. A multiple use cooling apparatus comprising in combination:
   (a) an enbloc ice cream machine having self contained refrigerating means, with a refrigerating circuit associated therewith, and with said enbloc ice cream machine having a support plate fixed to the top thereof, and said support plate having an opening therein providing communication with a mixing container of said enbloc ice cream machine;
   (b) furniture means having an opening at the top thereof, with said enbloc ice cream machine arranged in said opening and supported on top of said furniture means to project into said furniture means, and to define, with the inside walls of said furniture means, a free space thereunder;
   (c) door means provided on said furniture means to provide selective access to said free space;
   (d) insulating means arranged in said free space associated with said furniture means to define an insulated free space;
   (e) refrigerating plate means located in said free space connected in parallel with said refrigerating circuit of said self-contained refrigerating means; and
   (f) valve means associated with said refrigerating plate means and with said refrigerating circuit for selectively connecting said refrigerating circuit to said refrigerating plate, for when said ice cream machine is not in use, for cooling said insulated free space.

2. An apparatus as in claim 1 wherein said insulating means comprises insulating panels fixed to the inside walls of said furniture means defining said free space.

3. An apparatus as in claim 1 wherein said enbloc ice cream machine is supported on said furniture means by said support plate, with said support plate overlapping the edges of said furniture means defining said top opening.

4. An apparatus as in claim 3 wherein said furniture means comprises a kitchen cabinet.

5. An apparatus as in claim 1 further comprising a control panel having actuatable control switch means for selectively controlling the operation of said ice cream machine.

6. An apparatus as in claim 1 wherein said enbloc ice cream machine mixing container is adapted for containing ice cream and comprises stirring means for stirring ice cream contained in said mixing container means.

7. An apparatus as in claim 1 wherein said refrigerating plate, when connected to said refrigerating circuit, is adapted for cooling said insulated free space to a temperature of about 6°-10° C. whereby comestibles such as wine, fruits or vegetables can be preserved therein.

* * * * *